United States Patent [19]
Donnadieu

[11] 3,918,299
[45] Nov. 11, 1975

[54] ARRANGEMENT FOR USE IN THE STUDY OF THE PROPAGATION OF CRACKS

[75] Inventor: Henri Donnadieu, Le Pecq, France

[73] Assignee: Institut de Recherches de la Siderurgie Francaise, Saint-Germain-en-Laye, France

[22] Filed: Mar. 21, 1974

[21] Appl. No.: 453,355

[30] Foreign Application Priority Data
Mar. 23, 1973 France .............................. 73.10605

[52] U.S. Cl. .................................................. 73/91
[51] Int. Cl. ................................................. G01n 3/32
[58] Field of Search .................. 73/91, 88 R, 104, 95

[56] References Cited
UNITED STATES PATENTS
3,628,377  12/1971  Weiss ...................................... 73/91
3,845,657  11/1974  Hall et al. ......................... 73/88.5 R

FOREIGN PATENTS OR APPLICATIONS
1,057,899   2/1967   United Kingdom ..................... 73/91

Primary Examiner—Jerry W. Myracle
Attorney, Agent, or Firm—Michael S. Striker

[57] ABSTRACT

A crack-detecting unit is operative for examining a limited portion of an object to determine whether such portion is cracked. When the crack-detecting unit determines that the portion of the object being examined is cracked, a control unit automatically causes the crack-detecting unit to examine the next portion of the object, thus proceeding from one limited portion of the object to the next, along the direction of propagation of the crack. A recording unit automatically makes a record of the examination by the crack-detecting unit of the successive portions of the object, to thereby make a record of the propagation of the crack.

30 Claims, 5 Drawing Figures

ARRANGEMENT FOR USE IN THE STUDY OF THE PROPAGATION OF CRACKS

BACKGROUND OF THE INVENTION

The invention relates to the study of the propagation of cracks, particularly in objects in which fatigue cracks develop.

In order to estimate the useful life of structures subjected to oscillating stresses, it is necessary to determine the behavior of the constituent elements of the structure when subjected to cyclic stresses. When a structural element is subjected to such stresses, fatigue cracks are liable to initiate in the element at a fault or discontinuity and then propagate in the structural element with a certain velocity.

Initiation and propagation of a crack in an object which is subjected to cyclic stresses are phenomena dependent upon a large number of parameters, and especially upon the nature and structural characteristics of the material under stress, the magnitude and character of the applied stress, the number and frequency of the stress cycles, and the environment.

The experimental study of fatigue crack formation involves detecting the initiation of a crack in an object under examination, and then in determining the velocity of propagation of the crack as a function of the conditions of applied stress and as a function of the geometry of the object. Experimental studies of this kind can lead to the adoption of safety standards in the design of structures which in use are subjected to cyclic stresses.

SUMMARY OF THE INVENTION

It is a general object of the invention to provide an arrangement which is operative for automatically determining and recording the velocity of propagation of a crack in an object.

This object, and other objects which will become more understandable from the description below of specific embodiments, can be met, according to one advantageous concept of the invention, by providing an arrangement for use in the study of the propagation of cracks, comprising, in combination, crack-detecting means operative for examining a limited portion of an object to determine whether such portion is cracked. Also provided is control means automatically operative in response to a determination by the detecting means that the portion being examined is cracked for causing the crack-detecting means to examine the next portion of the object, in the direction of propagation of the crack, thus proceeding from one limited portion of the object to the next, along the direction of propagation of the crack. Recording means is provided for automatically making a record of the examination by the detecting means of the successive portions of the object to thereby make a record of the propagation of the crack.

According to a further advantageous concept of the invention, I provide an arrangement for use in the study of the propagation of cracks, comprising, in combination, crack-detecting means operative for detecting the existence of a crack in an object, and control means. The control means is operative for automatically effecting relative movement between the crack-detecting means and the object in the direction of propagation of a crack detected by the crack-detecting means, when the crack-detecting means detects a crack. There is also provided recording means operative for automatically making a record of such relative movement to thereby make a record of the propagation of the crack.

According to a further advantageous concept, the crack-detecting means is comprised of a crack-detecting transducer operative for generating an electrical signal having a value indicative of the extent to which the portion of the object being examined is cracked. A comparator circuit is provided, for comparing such signal with a reference signal, and when the measurement signal exceeds the reference signal, indicating that the examined portion is cracked to a predetermined extent, then and only then does the control means respond by causing the crack-detecting transducer to examine the next limited portion of the object, proceeding in the direction of propagation of the crack. According to one simple and advantageous expedient, the object is subjected to stress in a predetermined direction, to cause the crack to propagate in a predetermined direction, and the crack-detecting means and/or the object are mounted for relative movement along such direction of propagation. For example, the crack-detecting means may be mounted on a rod which is mounted for longitudinal movement parallel to the direction of propagation of the crack.

Structures subjected to stresses such as cause fatigue cracks are often constructed of materials having a high modulus of elasticity, and in particular of metal. When electrically conductive material is employed, it is possible to generate eddy currents in the material of the object, by means of an induced magnetic field, the field being produced by a conductive winding through which a high-frequency energizing current passes. To this end, particularly advantageous use may be made of inductive transducers. A particular embodiment of an inductive transducer suitable for the purpose is described in detail below.

The formation and propagation of a crack are likely to occur and continue over test periods of considerable length, especially when the test conditions simulate the conditions in which the structural element being tested is employed in actual use. Usually, very high values of applied stress, such as result in abrupt failure of the element being stressed, are not employed in fatigue studies of the type in question. On the other hand, when the amplitude of the applied stress is low, a very long time may pass before a fatigue crack forms, if one forms at all. Moreover, the propagation of such crack may be exceedingly slow during the greater part of the test.

As mentioned above, it is contemplated, as one possibility according to the invention, to provide crack-detecting means operative for generating a crack-indicating signal having a value (e.g., magnitude, frequency, phase, or the like) indicative of the extent to which the portion of the object being examined is cracked, with the examination of the next portion of the crack, proceeding in the direction of propagation of the crack, commencing only when the crack-indicating signal exceeds a predetermined value. This is of particular advantage when the propagation of the crack is exceedingly slow, because it eliminates excessively frequent activation of the control means. Thus, for example, the control means can be made operative for causing the crack-detecting means to examine successive limited portions of the object in a step-by-step operation, instead of continuously; the steps, however, being of a sufficiently short length, and the response threshold for the crack-indicating signal being low enough, the examination of successive portions of the object does as desired closely follow the crack as the latter propagates. For example, if the control means is operative for effecting relative movement between the crack-detecting means and the object in which the crack is propagating, then the establishment of a threshold value above with the crack-indicating signal must rise to initiate such relative movement makes it possible to greatly reduce the number of times the moving means of such arrangement becomes activated, without markedly reducing the precision of the measurements, i.e., without markedly reducing the closeness with which the crack-detecting means follows the propagating crack.

Establishment of a threshold value above which the value of the crack-indicating signal must rise to activate the control means has a further advantage, in that the control means need be responsive only to signals of relatively large magnitude. This largely precludes the possibility of the control means becoming activated as a result of noise or interference signals generated by the crack-detecting transducer, particularly if the latter is inductive.

In this connection, it will be understood that the advantageous expedient just mentioned brings with it no loss of accuracy, even when the propagation of the crack is relatively fast, because the threshold value for the crack-indicating signal will be so chosen that the pauses in the operation of the follow-up action will be very short compared to the total test duration; i.e., while not truly continuous, the follow-up operation may be considered virtually continuous, insofar as the accuracy and precision of the test results is concerned. The follow-up action can be made as nearly continuous as desired.

As a further possibility according to the invention, at the beginning of a crack study, the automatic follow-up action can be dispensed with. In that case, as the crack propagates through the limited portion of the object being examined by the crack-detecting means, the value of the signal generated by the crack-detecting means will steadily increase, thereby providing another form of indication of the progress of the crack over the portion of the object in question. This approach is somewhat different than the ones previously described, because the portion of the object which the crack-detecting means examines at any one time will in general be much longer, in the direction of propagation of the crack, than the distance by which the portion being examined is shifted in response to detection of a crack with the automatic follow-up expedients discussed above.

DESCRIPTION OF THE PREFERRED EMBODIMENTS

In the illustrated embodiments, the crack-detecting means and the object in which the crack propagates are relatively movable in the direction of propagation of the crack, the direction of propagation of the crack being predetermined in the illustrated embodiments. In particular, in the illustrated embodiments, it is the crack-detecting means which is mounted for movement relative to the object, in the direction of propagation of the crack.

Figure 1:
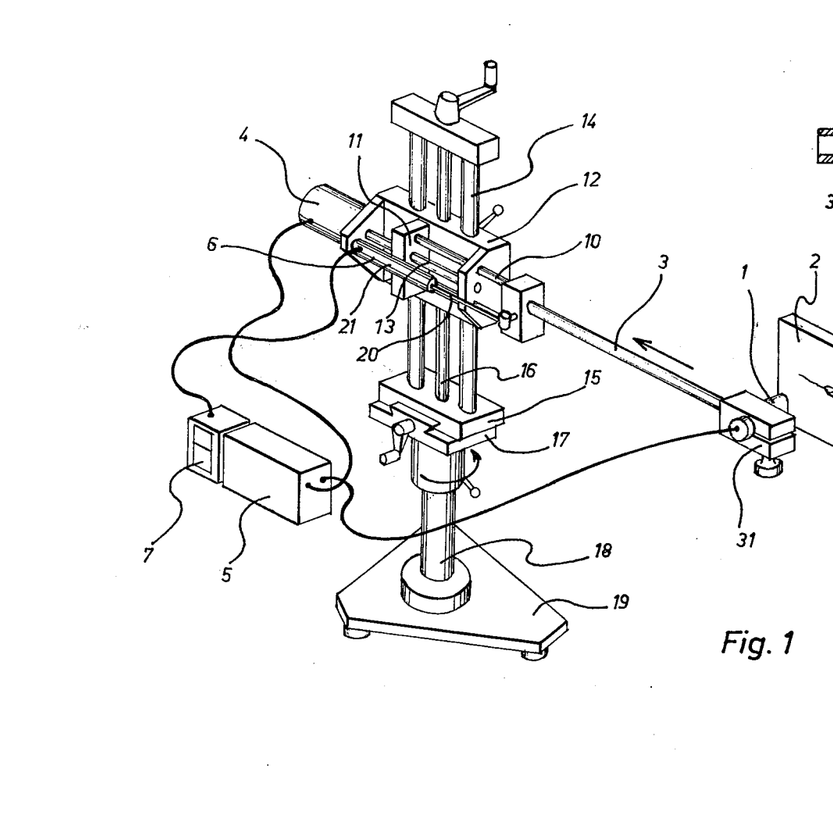
FIG. 1 is a perspective view showing the general appearance of one exemplary arrangement according to the invention.

In FIG. 1, reference numeral 1 designates a crack-detecting transducer which is positioned opposite an object 2 which is subjected to cyclical stress. The crack-detecting transducer 1 is mounted for translational movement on a movable arm 3. The arm 3 is moved longitudinally, through the intermediary of various force-transmitting components, by a drive motor 4, which in turn is controlled by a control system which will be described in great detail below. The movements of the arm 3 are detected by a position-detecting transducer 6 and are registered by a recording device 7.

The test object 2 can be constituted by a standardized flat parallelepiped of the material under investigation, provided with a notch 8 having a bevelled root portion, and two holes 9 which are engaged by engaging members 9a of an arrangement (schematically shown in FIG. 5) for holding and cyclically stressing the test object, to cause the formation of a fatigue crack. In this embodiment, the stressing is performed in a predetermined direction, and the orientation of the notch 8 is likewise predetermined, so that the fatigue crack, too, will propagate in a predetermined direction.

The supporting arm 3 is rigidly fixed by means of rods 10 to a non-rotatable first screw-threaded means 11 which is mounted and guided for translational motion relative to a mounting structure 12. The screw-threaded means 11 cooperates with second screw-threaded means 13, in the form of a screw-threaded drive spindle. Spindle 13 can rotate within the mounting structure 12, and can be connected to the motor 4 by means of a coupling (not shown in FIG. 1). The member 11 and the drive screw 13 are preferably provided with a cylindrical internal thread and a cylindrical external thread, respectively, cooperating by means of ball bearings in a manner well known in the field of mechanical transmissions.

The structure 12 is slidably mounted on vertical guide rods 14 rigidly fixed to a movable saddle plate 15. The structure 12 is movable on the rods 14 by turning a central drive screw 16, the external threads of which cooperate with an internal screw thread of the structure 12. The saddle plate 15 is movable relative to the guide plate 17, the latter having a cross-sectional configuration including a dovetail-shaped guide portion. Displacement of the saddle plate 15 relative to the guide plate 17 is effected by cranking the associated handle, which operates a screw-and-nut drive mechanism. The guide member 17 is mounted on a column 18 and can be rotated relative to such column, as indicated by the arrow. Locking members are provided to secure the structure 12 and the members 15, 17 in the desired positions. The column 18 is rigidly mounted on a base 19 which can be fixed in position on a work table by any known means, for example, by means of an electromagnet rigidly fixed to the base plate 19.

The parts of the arrangement just described are provided to permit the greatest possible freedom in the selection of the position and orientation of the crack-detecting transducer 1, and in particular to assure that the longitudinal sliding of the arm 3 occurs in a direction exactly parallel to one face of the test object 2.

The arm 3 is rigidly fixed to a rod 20 which passes into a cylinder 21 rigidly mounted on the structure 12. A position-detecting transducer 6, operative for generating a signal indicative of the position of the arm 3, is provided inside the cylinder 21. In the illustrated embodiments, position-detecting transducer 6 is a linear potentiometer. However, use may be made of any other position-detecting transducer arrangement capable of delivering a signal which is proportional to, or stands in some other known relationship, to the longitudinal position of the slidable arm 3. The position-indicating signal can be either an analog signal or converted into digital form for processing in a digital computer.

Figure 2:
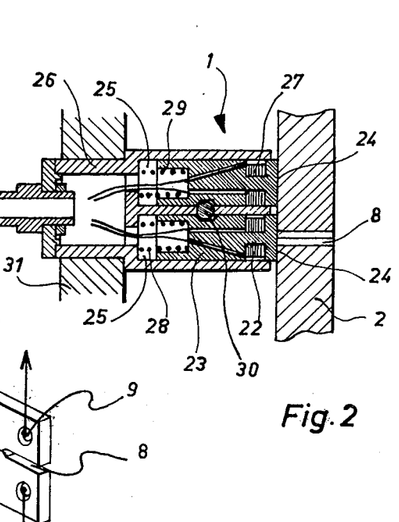
FIG. 2 depicts one embodiment of a crack-detecting transducer which can be used according to the invention.

The construction of one exemplary crack-detecting transducer 1 is depicted in FIG. 2. The transducer is comprised of a coil 22 composed of a large number of turns of conductive wire wound on a coil former 23 made of synthetic material and having an axial end face 24. The coil former is slidably mounted within a cylindrical recess 25 formed inside a metallic casing 26. The metal of casing 26 is advantageously of high magnetic permeability, so as to constitute a lateral shield with respect to the field produced by the coil. This avoids the influence of parasitic metallic masses on the transducer. A second coil 27 identical to coil 22 is also mounted within the casing, the axes of the coils 22, 27 being parallel. Biasing means, in the form of compression springs 28, 29, abut with their left ends against a radial shoulder of the casing 26, and abut with their right ends against recesses in the core formers 23. In this way, the compression springs 28, 29 normally urge the axial end faces 24 of the core formers 23 into contact with the flat surface of the test object 2. The axial movement of the core formers 23 and the coils 22, 27 thereon is limited by means of a stud 30. The conductors of the two coils are joined electrically by means of leads attached to a coaxial connection. The casing 26 has an external mounting extension which is engaged by a clamp arrangement 31 (see also FIG. 1) which is mounted at the end of supporting arm 3, thus making it possible to adjust the orientation of the plane containing the axes of the two coils with respect to the arm 3.

Figure 3:
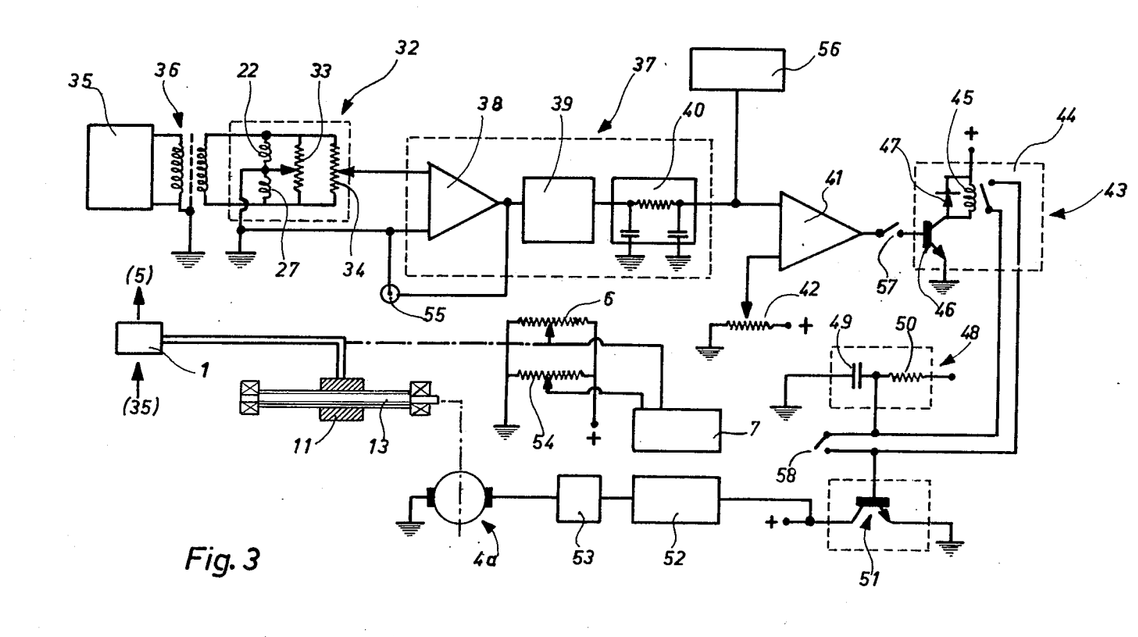
FIG. 3 depicts a first exemplary control system according to the invention.

FIG. 3 depicts a first exemplary embodiment of a control or monitoring system 5 for the arrangement of FIG. 1. The two coils 22, 27 mentioned before form part of a measuring bridge circuit comprised also of two potentiometer resistors 33, 34. The two coils 22, 27 are connected in series across a high-frequency current source comprised of an oscillator 35 operative for generating a sinusoidal output voltage having a frequency of a few kilohertz, and further comprised of an isolating transformer 36. The potentiometer resistors 33, 34 are connected in parallel with the series connection of coils 22, 27. The wiper of potentiometer 33 is connected to the junction of the two coils 22, 27. The wiper of potentiometer 34 constitutes one of the two output terminals of the bridge circuit. The other output terminal is the junction between coils 22, 27, which junction is grounded. The potentiometers 33, 34 permit balancing of the bridge 32 with respect to phase and amplitude, since in actual practice the two coils 22, 27 cannot have exactly identical characteristics.

The control system 5, as shown in FIG. 3, is comprised of an amplification and detection unit 37 comprised of an amplifier 38, a full-wave rectifier 39 and a low-pass filter 40. The variable-amplitude sinusoidal signal generated across the output terminals of bridge circuit 32 is accordingly amplified, rectified and smoothed, to yield a smooth D.C. output signal having a magnitude dependent upon the extent to which the portion of object 2 adjacent the transducer is cracked.

This variable-magnitude D.C. voltage is applied to a first input of a comparator 41, here in the form of an operational amplifier used as a threshold detecting device. The second input of comparator 41 is connected to the wiper of a reference potentiometer 42. The comparator circuit is so designed as to generate a control signal at its output when the value of the signal applied to its first input, derived from the bridge circuit 32, is equal to or higher than the value of the signal applied from the wiper of reference potentiometer 42. In the illustrated embodiment, the comparator generates a control voltage of +15 V when the first signal equals or exceeds the second, and an output signal of 15 V otherwise.

The control signal appearing at the comparator output is applied to a switch unit, generally designated 43. The switch unit 43 is comprised of an electromagnetic relay 44 including a relay winding 45. The relay winding 45 is connected in the collector circuit of a unijunction transistor 46, the base of which is connected to the output of comparator 41. A diode 47 shunts the relay winding 45, to protect the transistor against transient voltages of excessive magnitude.

The relay 44 is interposed in the control circuit of the drive unit which, in the embodiment of FIG. 3, is comprised of a stepping motor 4a. This motor-control circuit includes a circuit stage 48 which is capable of generating a recurrent signal and is essentially comprised of a capacitor 49 charged through a resistor 50. The values of capacitor 49 and resistor 50 are such as to set the pulse-repetition frequency of the circuit at a desired value, in the present embodiment 1 Hz. The control circuit for the stepping motor includes a transistor 51, the base of which can be connected to the device 48 to receive the recurrent signal, the transistor 51 being conductive when the applied recurrent signal exceeds a predetermined threshold value. The collector waveform of transistor 51 is applied to a circuit stage 52, which clips the waveform and then amplfies, it, so as to obtain motor operating pulses of predetermined shape having the pulse-repetition frequency established by circuit stage 48. In the present example, this pulse train is a square wave having a pulse-duration of 30 ms and a pulse-repetition period of 1 second. This square wave controls the operation of a relay 53 which, when energized, initiates operation of the stepping motor. The output shaft of the motor is connected to the drive spindle 13 which drives the internally threaded member 11 rigidly connected to transducer-supporting arm 3. A potentiometer 54 is connected in parallel across the terminals of position-indicating potentiometer 6; the position-indicating signal indicative of the position of arm 3 is taken across the wipers of potentiometers 6 and 54, and is applied to the input of a recording unit 7. The second potentiometer 54 is provided to facilitate nulling of the position-indicating transducer. The recording unit 7 can be of various known types, for example, a magnetic-tape recorder continuously operative for continuously recording the value of the position-indicating signal, a curve or chart plotter, etc.

A socket connection 55 is provided, the contacts of which are connected respectively to ground and to the output terminal of amplifier 38. A suitable meter, or for example an oscilloscope, can be connected into socket 55, to permit examination of the A.C. output signal derived from bridge circuit 32, to further facilitate balancing of the bridge. A unit 56 is connected to the output of amplification and detection stage 37, and is operative for continuously recording the value of the signal at the output of filter 40. A switch 57 is interposed between the output of comparator 41 and the input of switch unit 43. By opening switch 57, the control loop is interrupted, and the position of the transducer 1 will no longer be automatically changed. This may be desired, for example, in order to study the development of the crack in a particular limited portion within the pick-up range of the transducer; the signal recorded by recorder 56 will constitute an indication of such crack development, and the signal will reach values higher than necessary to activate the comparator 41, which is why the switch 57 must be opened if this mode of operation is desired.

A further control swtich 58 can be provided interposed between the output of the recurrent-signal generator stage 48 and the base of transistor switch stage 51, in order to permit manual control of the motor. For example, it might for some reason be desired to personally monitor the value of the crack-indicating signal at the output of filter 40 and then to manually close switch 58 until such time as the crack-indicating signal decreases in value to a predetermined extent.

Figure 4:
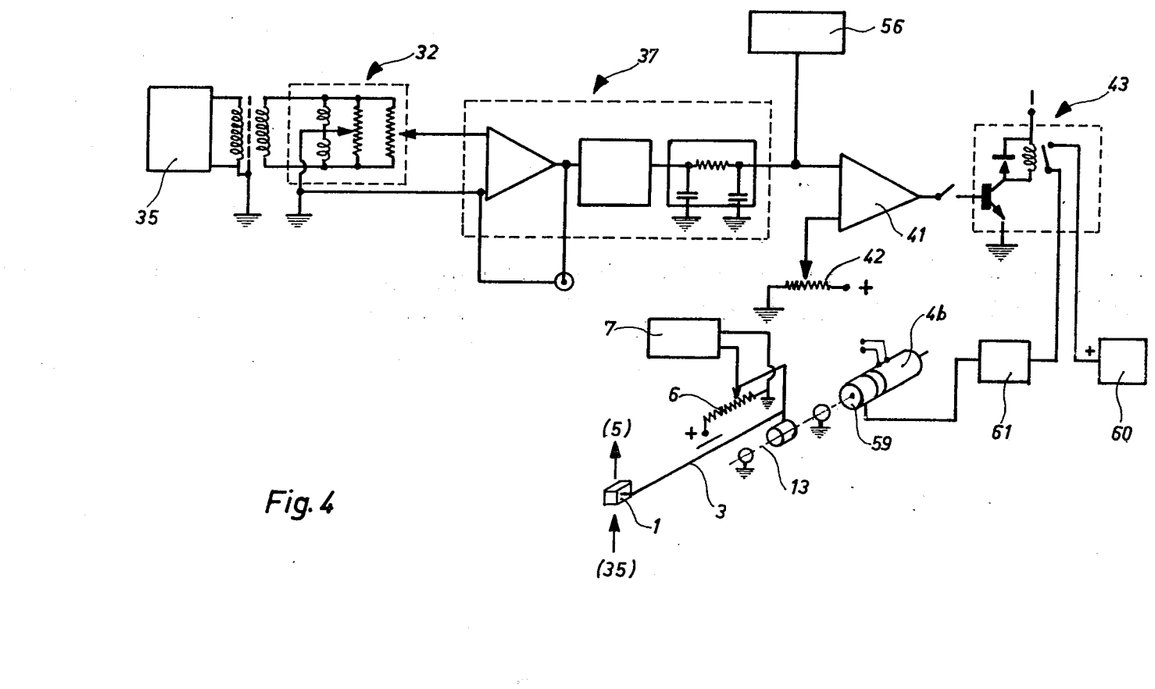
FIG. 4 depicts a second exemplary control system according to the invention.

FIG. 4 depicts a second embodiment of the control system. Whereas in FIG. 3 the drive motor is an intermittently operating stepping motor, the drive motor of FIG. 4 is a continuously rotating motor. In other respects, the FIG. 4 embodiment is the same as the FIG. 3 embodiment, corresponding components being designated by the same reference numerals.

The continuously rotating motor 4b of FIG. 4 can be coupled to screw-threaded drive spindle 13 by means of an electromagnetic clutch 59, which is controlled by means of the switching unit 43. The relay switch of relay 44 is interposed between a control signal generator 60 and a relay 61 which initiates the operation of the clutch 59.

Figure 5:
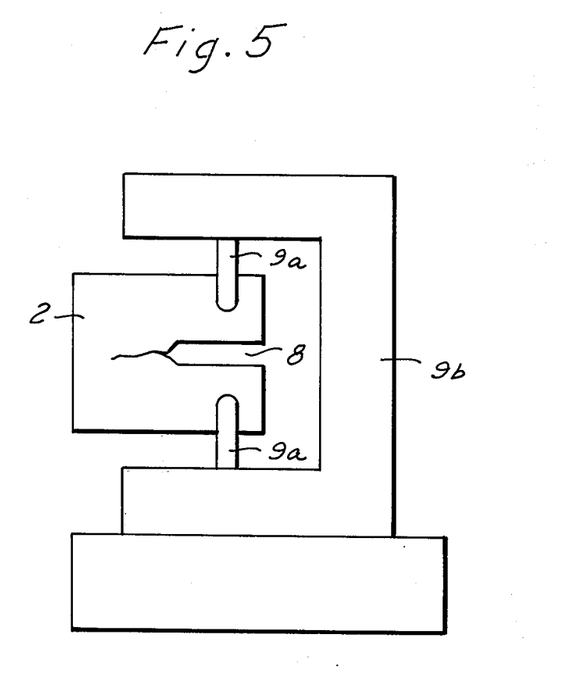
FIG. 5 depicts in very schematic manner means for holding and cyclically stressing a test object for the purpose of causing formation and propagation of a fatigue crack.

FIG. 5 depicts in very schematic manner a holding and stressing means 9b comprised of jaws 9a which engage the holes 9 in the test object 2 and which stress the test object 2 in cyclical manner, to produce a fatigue crack.

The operation of the exemplary embodiments will now be described.

Tests relating to the development and propagation of fatigue cracks are usually carried out on standardized specimens or test objects, for example of the type in which a lateral notch has been formed, such as the test object 2 shown in FIG. 1. The test object is fixed between the jaws 9a of a fatigue-testing machine 9b by means of the holes 9, to ensure that the notch 8 is oriented horizontally. The casing 26 is properly positioned within clamp arrangement 31 to ensure that the plane containing the axes of coils 22, 27 is perpendicular to the general direction of the notch 8. The axial end faces of the coil formers 23 are brought into contact with one side face of the test object 2 under the biasing action of compression springs 28, 29. The position and/or orientation of the support structure 12 are adjusted to the extent necessary, by means of the various controls described with reference to FIG. 1, to ensure that the longitudinal movement of the arm 3 takes place in a direction parallel to that face of the test piece against which the transducer 1 presses.

Assume that the control system has been disconnected, for example by opening switch 57. The bridge circuit 32 is balanced by adjusting the potentiometers 33, 34. This balance is established under the condition of substantially identical current distribution of the currents induced in the test object 2, i.e., when the fields of both coils 22, 27 pass through portions of the test piece 2 of identical unfaulted character. The condition of bridge circuit balance can be verified by connecting the input of an oscilloscope to the socket outlet 55; balance is indicated by a straight line on the scope screen, whereas imbalance converts the straight line into a sine wave.

Next, the coil 22 is moved into the vicinity of the root of the notch 8. The notch constitutes in effect a "crack" insofar as the balance of the bridge circuit is concerned. The position of the crack-detecting transducer can be adjusted so that it is located at the lower limit of non-disturbance of the signal by the presence of the notch.

The test object 2 is subjected to cyclical stresses which lead to the development of a crack at the root of the notch 8. Such development of a crack results in loss of balance of the bridge circuit, due to the effect of the crack upon the distribution of eddy currents induced in the electrically conductive test object 2 and upon the impedance of winding 22. The imbalance signal can be recorded on the direct recorder 56, for example in the form of a plotted graph of instantaneous value, after amplification, rectification and filtering of the imbalance signal. Thus, it is possible to follow the initial progress of a crack during the time in which the crack propagates in the particular portion of the test object 2 being examined by the crack-detecting transducer 1, i.e., in the portion of the test object 2 penetrated by the preponderant portion of the field emanating from coil 22.

Switch 57 is then closed, to establish the automatic control loop, and operation of the follow-up system is thereby initiated.

Alternatively, if it is not desired to monitor the beginning of the propagation of the crack in the manner just explained, the switch 57 can be closed right from the start, so that virtually as soon as the crack begins to form and propagate the follow-up system will respond, the wiper of potentiometer 42 being set to establish the threshold of response for the system.

In the example under consideration, the amplitude of the voltage at the output of filter 40 required to trigger comparator 41 will be substantially less than the maximum amplitude which can be developed by the coil 22 and stage 37, and registered by the recorder 56, when the control loop is not closed, i.e., when switch 57 is open.

However, assume that the switch 57 is now closed. So long as the voltage applied to the upper input of comparator 41 is lower than the reference voltage from potentiometer 42, the comparator 41 generates a negative output voltage, and the transistor 46 is non-conductive.

When the magnitude of the signal from stage 37 exceeds the magnitude of the reference signal from potentiometer 42, a positive voltage appears at the output of comparator 41, and transistor 46 becomes conductive, energizing relay winding 45 and closing relay 44. The manual control switch 58 remains open during normal operation.

The capacitor 49 of circuit stage 48 is then permitted to discharge through the base-emitter path of the transistor 51 to ground. During this discharge time, the transistor 51 becomes conductive, and a signal is transmitted to the clipping and amplifying circuit stage 52. This signal is shaped and amplified and appears at the output of stage 52 as a square wave which triggers the power relay 53 and initiates the operation of the stepping motor 4a. In the exemplary embodiment, the motor causes the screw-threaded drive spindle 13 to turn through 30 upon each receipt of a stepping motor triggering pulse, and the pitch of the threaded spindle 13 is such that this angular rotation produces a longitudinal shifting of arm 3 by a distance of 0.1 mm. If, as a result of this movement of arm 3, the signal applied to the comparator 41 falls below the reference value, the comparator renders transistor 46 nonconductive, opening relay 44, and the rotation of the motor 4a does not continue. On the other hand, if after the arm 3 has thusly moved a distance of 0.1 mm the crack-indicating signal is still higher than the reference signal from potentiometer 42, which is likely to be the case when the velocity of crack propagation is high, the comparator does not render transistor 46 non-conductive, and the relay 44 remains closed. The circuit stage 48 generates recurrent signals at the frequency determined by the values of capacitor 49 and resistor 50, the capacitor being charged and discharged cyclically. The thusly formed pulse train is converted by transistor stage 51 and amplifier 52 into a pulse train which causes successive rotational steps to be performed by the stepping motor at the pulse-repetition frequency associated with circuit stage 48, namely, 1 Hz in this example; eventually, the crack-indicating signal falls below the reference signal, and for the reasons explained above motor 4a ceases to operate. In this example, the time required for stepping motor 4a to perform one rotational step rotation is less than the period of the pulse train generated by circuit stage 48.

Accordingly, the arm 3 slides longitudinally in successive steps of 0.1 mm each at a rate which is dependent on the velocity of propagation of the crack in the object 2. The position-indicating potentiometer 6 generates a signal indicative of these successive displacements of arm 3, and the position-indicating signal is recorded, for example automatically plotted as a function of time, or preferably as a function of the number of stress cycles to which the test object 2 is subjected.

In the embodiment of FIG. 4, the switch unit 43 initiates the operation of the electromagnetic clutch 59 by activating the relay 61. The continuous rotation of the motor 4b is transmitted to the drive spindle 13 for as long as switching unit 43 remains conductive. However, as soon as the crack-indicating signal falls below the reference signal from potentiometer 42, the drive spindle 13 ceases turning, as a result of disengagement of the clutch.

As the arm 3 travels longitudinally, and the transducer 1 with it, the coil formers 23 of the coils 22, 27 remain pressed against the surface of the test object 2 under the action of the biasing springs 28, 29, even in the event of imperfect parallel alignment. This prevents the development of highly objectionable spurious signals such as would result if an air wedge developed between the transducer 1 and the face of the test object 2.

The exemplary arrangements disclosed herein are well suited for the study of the velocity of propagation of cracks in objects subjected to cyclic stress. The exemplary use of an inductive transducer makes the device very sensitive, since the start of cracking can be detected on a virtually microscopic scale. The exemplary arrangement in which the inductive transducer is part of a bridge circuit having one arm in the form of a winding identical to and adjacent to the transducer winding results in a measurement which is substantially independent of temperature variations; this represents a marked improvement over standard transducers of this type which are very much dependent upon such variations. Furthermore, any variation in the permeability of the material of the test object does not have any appreciable effect on the measurement obtained, since such variation would produce counteracting effects in the two windings. The use of a stepping motor is advantageous, for the reason that the precision of the measurement is limited only by the displacement of the arm corresponding to one step of the stepping motor, since the number of individual steps performed by the stepping motor can readily be counted.

It will be understood that each of the elements described above, or two or more together, may also find a useful application in other types of circuits and constructions differing from the types described above.

While the invention has been illustrated and describe as embodied in an arrangement for use in the study of the propagation of cracks in objects, particularly fatigue cracks resulting from cyclical stresses, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. An arrangement for use in the study of the propagation of cracks, comprising, in combination, crack-detecting means operative for examining a limited portion of an object to determine whether such portion is cracked; control means automatically operative in response to determination by said detecting means that the portion being examined is cracked for causing the crack-detecting means to examine the next portion of the object in the direction of propagation of the crack; and recording means for automatically making a record of the examination by the detecting means of the successive portions of the object to thereby make a record of the propagation of the crack.

2. An arrangement as defined in claim 1, wherein said crack-detecting means comprises means operative for generating a first signal having a value indicative of the extent to which the portion of the object being examined is cracked, and wherein said control means includes reference means operative for generating a second signal, comparator means having first and second inputs connected to respectively receive said first and second signals and operative for generating a control signal when the difference between said first and second signals exceeds a predetermined value, and wherein said control means further comprises means operative in response to generation of said control signal for causing said crack-detecting means to examine the next portion of the object in the direction of propagation of the crack.

3. An arrangement as defined in claim 1, wherein said crack-detecting means comprises means operative for dissipating energy in a limited portion of the object to a degree dependent upon whether such limited portion is cracked, and means for generating a signal having a value dependent upon such energy dissipation.

4. An arrangement as defined in claim 1, said crack-detecting means being operative for detecting cracks in an object comprised of electrically conductive material, and wherein said crack-detecting means comprises means for establishing a high-frequency magnetic field passing through a limited portion of the object to establish the flow of eddy currents in such portion and thereby dissipate electrical energy in such portion to an extent dependent upon whether such portion is cracked, and means for generating a signal having a value dependent upon the degree of such dissipation of electrical energy.

5. An arrangement as defined in claim 1, wherein said crack-detecting means comprises an inductive transducer and a source of high-frequency energizing current for said inductive transducer.

6. An arrangement as defined in claim 1, wherein said crack-detecting means comprises means for generating a signal having a value indicative of the extent to which the portion of the object being examined by the crack-detecting means is cracked, and wherein said control means comprises deactivating switch means operable for deactivating said control means to prevent said crack-detecting means from examining the next portion of the object.

7. An arrangement for use in the study of the propagation of cracks, comprising, in combination, crack-detecting means operative for detecting the existence of a crack in an object; control means operative for automatically effecting relative movement between the crack-detecting means and the object in the direction of propagation of a crack detected by the crack-detecting means; and recording means operative for automatically making a record of the relative movement and thereby a record of the propagation of the crack.

8. An arrangement as defined in claim 7, wherein said control means comprises means operative for automatically moving said crack-detecting means in the direction of propagation of a crack detected by said crack-detecting means.

9. An arrangement as defined in claim 8, wherein said recording means comprises a position-detecting transducer operative for generating a signal indicative of the position of said crack-detecting means, said position-detecting transducer comprising a linear potentiometer having a wiper mechanically coupled to said crack-detecting means.

10. An arrangement as defined in claim 8, wherein said control means comprises an elongated supporting structure supporting said crack-detecting means, means mounting and guiding said elongated supporting structure for longitudinal movement, and wherein said control means comprises non-rotatable first screw-threaded means connected to said longitudinally movable supporting structure, second screw-threaded means operative for driving said first screw-threaded means, and drive means for rotating said second screw-threaded means to cause longitudinal movement of said first screw-threaded means along the direction of propagation of a crack detected by said crack-detecting means.

11. An arrangement as defined in claim 7, and further including stressing means operative for holding a test object and causing the formation and propagation of a crack in the test object by stressing the test object, and wherein said control means comprises means operative for automatically effecting relative movement between said crack-detecting means and said stressing means in the direction of propagation of a crack detected by said crack-detecting means.

12. An arrangement as defined in claim 11, wherein said control means comprises means operative for automatically moving said crack-detecting means in the direction of propagation of a crack detected by said crack-detecting means.

13. An arrangement as defined in claim 7, wherein said crack-detecting means comprises means operative for generating a first signal having a value indicative of the extent of said crack, and wherein said control means includes reference means operative for generating a second signal, comparator means having first and second inputs connected to respectively receive said first and second signals and operative for generating a control signal when the difference between said first and second signals exceeds a predetermined value, and wherein said control means further comprises means operative in response to generation of said control signal for effecting relative movement between the crack-detecting means and the object in the direction of propagation of the crack detected by the crack-detecting means.

14. An arrangement as defined in claim 7, wherein said crack-detecting means comprises means operative for dissipating energy in a limited portion of the object to a degree dependent upon whether such limited portion is cracked, and means for generating a signal having a value dependent upon such energy dissipation.

15. An arrangement as defined in claim 7, said crack-detecting means being operative for detecting cracks in an object comprised of electrically conductive material, and wherein said crack-detecting means comprising means for establishing a high-frequency magnetic field passing through a limited portion of the object to establish the flow of eddy currents in such portion and thereby dissipate electrical energy in such portion to an extent dependent upon whether such portion is cracked, and means for generating a signal having a value dependent upon the degree of such dissipation of electrical energy.

16. An arrangement as defined in claim 7, wherein said crack-detecting means comprises an inductive transducer and a source of high-frequency energizing current for said inductive transducer.

17. An arrangement as defined in claim 7, wherein said crack-detecting means comprises a bridge circuit including a source of high-frequency current, an inductive transducer responsive to cracks in electrically conductive material and comprised of first and second substantially identical windings connected across said source.

18. An arrangement as defined in claim 17, wherein said bridge circuit further includes a potentiometer connected across said source, the output signal of said bridge circuit being the A.C. voltage drop between the junction of said first and second windings and the wiper of said potentiometer.

19. An arrangement as defined in claim 18, and further including an additional potentiometer connected across said source, the wiper of said additional potentiometer being electrically connected to the junction between said first and second windings, whereby to facilitate balancing of said bridge circuit.

20. An arrangement as defined in claim 17, wherein said first and second windings are constituted by respective first and second adjacent coils having parallel axes mounted for displacement in direction parallel to said axes, and biasing means for urging said coils into contact with an object to be examined by said crack-detecting means.

21. An arrangement as defined in claim 20, wherein said crack-detecting means further includes a casing at least partially surrounding said coils.

22. An arrangement as defined in claim 20, wherein said crack-detecting means further includes a shield of high-magnetic permeability at least partly surrounding said coils to shield said coils from the influence of stray magnetic flux.

23. An arrangement as defined in claim 7, wherein said crack-detecting means comprises means operative for generating an A.C. voltage having an amplitude indicative of the extent of said crack, and wherein said control means comprises an amplifier having an input connected to said crack-detecting means for receiving and amplifying said A.C. voltage, a rectifier connected to the output of said amplifier, and a low-pass filter connected to the output of said rectifier for converting said A.C. voltage into a D.C. voltage having a magnitude indicative of the extent of said crack.

24. An arrangement as defined in claim 23, wherein said control means further includes a source of variable voltage comprised of a reference potentiometer having a wiper, a comparator comprised of an operational amplifier having a first input connected to the output of said low-pass filter for receipt of said D.C. voltage and having a second input connected to said wiper of said reference potentiometer and operative for generating an output control signal when the difference between the voltages at the inputs thereof exceeds a predetermined value.

25. An arrangement as defined in claim 24, wherein said control means further includes an electromagnetic relay comprised of a relay winding, a transistor having an output current path connected in circuit with said relay winding for furnishing current to said relay winding and having an input circuit connected in circuit with the output of said comparator for receipt of said control signal.

26. An arrangement as defined in claim 7, wherein said control means comprises moving means for effecting said relative movment, and wherein said moving means comprises a movably mounted supporting structure, a drive motor for moving said supporting structure in the direction of propagation of the crack, and electromagnetic clutch means automatically operative for coupling said drive motor to said movably mounted supporting structure in force-transmitting manner in response to detection of a crack by said crack-detecting means.

27. An arrangement as defined in claim 7, wherein said control means comprises moving means for effecting said relative movement, and wherein said moving means comprises a movably mounted supporting structure, a drive motor for moving said supporting structure in the direction of propagation of the crack, said drive motor being an electrical stepper motor having an input and being operative for moving said movably mounted supporting structure a predetermined distance in response to receipt of a control pulse at said input of said motor, and pulse-generating means operative for applying a control pulse to said input of said motor when said crack-detecting means detects a crack.

28. An arrangement as defined in claim 27, wherein said pulse-generating means comprises means for generating a train of such control pulses for as long as said crack-detecting means continues to detect the existence of a crack.

29. An arrangement as defined in claim 7, wherein said crack-detecting means comprises means for generating a signal having a value indicative of the extent to which the portion of the object being examined by the crack-detecting means is cracked, and wherein said control means comprises deactivating switch means operable for deactivating said control means to prevent said control means from automatically effecting said relative movement.

30. An arrangement for use in the study of the propagation of cracks, comprising, in combination, detecting means for detecting the existence of a crack in an object; monitoring means for automatically monitoring the propagation of a crack detected by said detecting means; and recording means for automatically making a record of the operation of said monitoring means to thereby make a record of the propagation of the crack.

* * * * *